Jan. 8, 1929.  H. WIEMER  1,698,355

WATER PAN HOLDER

Filed May 23, 1927

Inventor
Henry Wiemer
By Louis H. Latta
Attorney

Patented Jan. 8, 1929.

1,698,355

UNITED STATES PATENT OFFICE.

HENRY WIEMER, OF DOW CITY, IOWA.

WATER-PAN HOLDER.

Application filed May 23, 1927. Serial No. 193,551.

My invention relates to a device for holding the water or feed pan or the like which is used in an individual hog house or the like, so that the pan may not be overturned by the animal using it. The present invention relates particularly to a holder adapted especially to the round, sheet metal type of pan.

An object of my invention is to provide a holder as indicated above, of simple, durable and inexpensive construction.

A further object of my invention is to provide such a holder which is very convenient in use, easy to manipulate, and may be self-adjusting to the pan which it holds, if desired. More particularly, it is my aim to provide a pan holder having a vertically adjustable holding member which is formed of a single piece of heavy wire or rod or the like, together with a clamping device adapted to be readily secured to the side wall of a hog house or the like, and simply constructed for efficiently gripping the vertical portion of the holding member, against the strains imposed by the rough usage which it ordinarily will receive, and yet adapted to instantly release the holding member when it is desired to remove the pan for cleaning or the like.

With these and other objects in view, my invention consists in the construction, arrangement, and combination of the various parts of my device, whereby the objects contemplated are attained, as hereinafter more fully set forth and pointed out in my claims, and illustrated in the accompanying drawings, in which—

Figure 1:
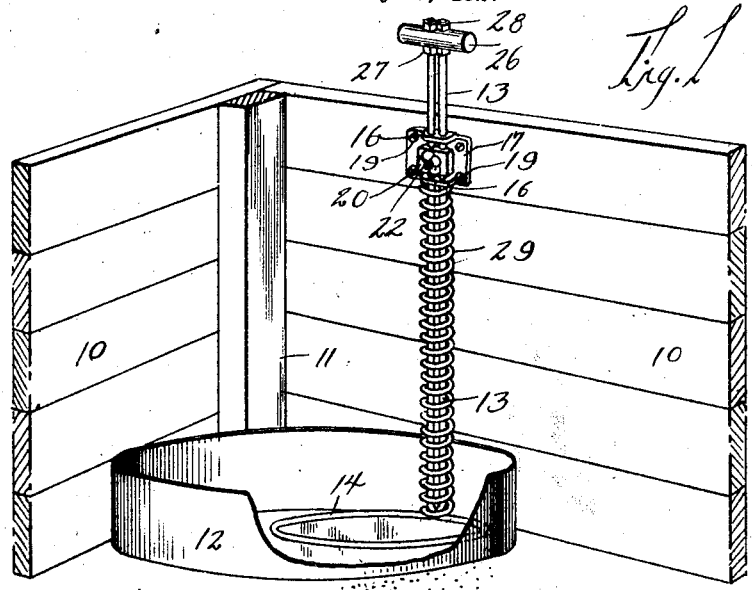
Figure 2:
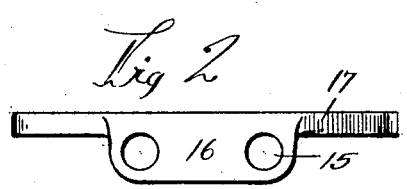
Figure 3:
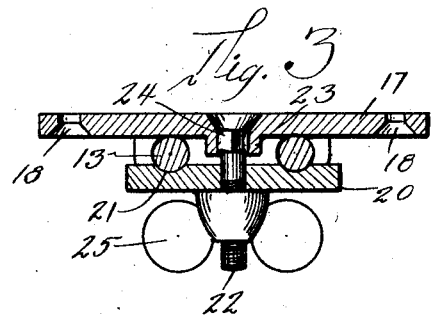
Figure 4:
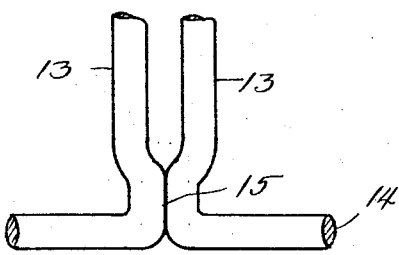

Fig. 1 is a perspective view of one corner of the inside of a hog house or the like, with my invention installed therein and holding a water pan or the like, a portion of which is broken away to better illustrate the holding device, Fig. 2 is a plan view of the bracket portion of the clamp, Fig. 3 is a longitudinal sectional view through the clamp, and Fig. 4 is an enlarged, detail view of the holding member, at the place where the vertical portion merges into the holding ring.

The desirability of a device to hold down an individual hog pan so that it can not be overturned by the hog, has already been recognized. Devices for that purpose, to be used in connection with the old wooden type trough, have already been devised. As far as I am aware, however, there has been no provision for holding the modern, all metal type pan. To provide a simple holder, needing no connection with the pan, and readily applied so as to securely hold the pan is the object of my invention.

In Fig. 1 I have shown, from the inside, the corner of a hog house or the like, having the side walls 10 and a corner post 11. The sheet metal water pan or the like 12 is ordinarily positioned in one corner of the hog house and it has therefore been shown in this position.

The holder comprises generally a holding member formed of a single length of heavy rod and bent to provide the spaced, vertical, parallel members 13 and the horizontal ring 14, which is formed from the central portion of the rod. The vertical members 13 are slidably mounted in openings 15, in ears 16, formed integrally with a bracket 17. Openings 18, in the bracket 17, allow the insertion of wood screws 19 for securing the bracket 17 to the wall 10 of the hog house.

The openings 15 are preferably formed tangent to the inner surface of the bracket 17 so that the rod portions 13 may lie in contact with the face of the bracket.

A clamp block 20 is provided with a pair of parallel grooves 21, (Fig. 3), spaced to receive the rod portions 13. A bolt 22 extends through a boss 23 in the center of the bracket 17 and has a squared portion 24, co-acting with a squared opening in said boss, so as to prevent rotation of the bolt. The bolt extends through a central opening in the clamping block 20 and a thumb nut 25 acts against the block 20 and is fitted upon the bolt 22 so as to tighten the block to contact with the rods 13.

Due to the surface of contact between the block 20 and the rods 13, a slight pressure upon the thumb nut 25 will securely lock the rod portions against longitudinal movement while a half-turn of the thumb nut will loosen the rods sufficiently to allow them to be moved quickly upward sufficiently to remove the ring 14 from the pan 12. In order to facilitate manipulation of the holding member, I provide a handle 26, which is preferably of wood and which is provided with a pair of openings receiving the rod portions 13, the latter being secured to the handle by means of nuts 27 and 28. It will now be noted that the device may be manipulated by engaging the thumb nut with one hand while the other hand is used to lift upon the handle 26.

Although not essential, I find that the device is improved by the use of a spring 29, compressed between the lower ear 16 and the ring 14 and surrounding the rod portions 13. The spring renders the device semi-automatc in operation, it being ordinarily necessary only to lift upon the handle, insert the pan and then to allow the ring to drop into contact with the bottom of the pan. Where the spring is used, the clamping device is ordinarily unnecessary. In this connection, it may be stated that the co-action of the rod portions 13 with the ears 16 is such that if the ring is pushed upwardly with a force which deviates from the true vertical, the rods will bind within the openings 15 and tend to lock against such upward movement.

Since the rods are of steel and have a certain amount of flexibility, it will readily be seen that ordinarily any movement imparted to the ring by a hog routing at the pan will tend to twist the vertical rod portions 13 laterally in addition to any lifting pressure that may be applied and this lateral twisting movement will cause the rods to bind within the openings 15. At the same time, should the rods give upwardly to any amount, the spring 29 will immediately return them downwardly as soon as the upward pressure is relaxed and it will be practically impossible for the hog to lift the holding device sufficiently to entirely overturn the pan, even though the clamp member is not utilized for securing the holding member rigidly in place. It may be noted further in this connection that the center of the ring is considerably offset, relative to the vertical rod portions 13, and that consequently upward pressure upon the ring will not be transmitted as a direct vertical pressure upon the vertical rod portions but as a combined vertical and lateral pressure, due to the offset of the center of application.

The clamping member may then be considered merely as a convenient means to be used under extraordinary conditions.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In an animal's water or feed pan holder, a holding member comprising a ring and a pair of parallel rod portions extending perpendicularly to the plane of the ring from one side thereof, and formed integrally with the ring, of a single length of rod, a bracket provided with a pair of spaced ears having openings through which said rod portions extend, a clamping block engaging the rods between said ears, a screw device for tightening said block against the rods, and a handle secured to the end of the rod portions, that part of the holding member which extends below the bracket being unconnected with the bracket.

2. In an animal's water or feed pan holder, a holding member comprising a ring and a pair of parallel rod portions extending perpendicularly to the plane of the ring from one side thereof, and formed integrally with the ring, of a single length of rod, a bracket provided with a pair of spaced ears having openings through which said rod portions extend, a coil spring encircling the rod portions and positioned between the bracket and the ring, that part of the holding member which extends below the bracket being unconnected with the bracket.

3. In a device of the class described, a holding member comprising a horizontal portion and a vertical portion extending upwardly from one side thereof, a bracket through which said vertical portion extends, and a coil spring encircling the vertical portion between the horizontal portion and the bracket, a clamping device coacting with said bracket and engaging the vertical portion, a screw device for tightening said clamping device against the vertical portion, and a handle secured to the end of the vertical portion.

Signed this 13 day of May, 1927, in the county of Crawford and State of Iowa.

HENRY WIEMER.